United States Patent

Higurashi

[11] Patent Number: 6,125,233
[45] Date of Patent: Sep. 26, 2000

[54] METHOD OF RECORDING ONE OF DIFFERENT DATA

[75] Inventor: Seiji Higurashi, Tokyo, Japan

[73] Assignee: Victor Company of Japan, Ltd., Japan

[21] Appl. No.: 08/956,904

[22] Filed: Oct. 23, 1997

[30] Foreign Application Priority Data

Dec. 25, 1996 [JP] Japan .................................. 8-346059

[51] Int. Cl.[7] .................................................. H04N 5/92
[52] U.S. Cl. .............................................. 386/108; 386/35
[58] Field of Search .................................. 386/1, 35, 40, 386/95, 37, 108, 111–112, 124; 131/123; 360/32; 348/443, 459; H04N 5/76, 5/92

[56] References Cited

U.S. PATENT DOCUMENTS

| | | | |
|---|---|---|---|
| 4,217,603 | 8/1980 | Hjortzberg | 358/12 |
| 5,493,413 | 2/1996 | Rhodes . | |
| 5,587,789 | 12/1996 | Lee et al. | 386/68 |
| 5,615,056 | 3/1997 | Oguro | 386/104 |
| 5,642,457 | 6/1997 | Higurashi | 386/108 |
| 5,712,947 | 1/1998 | Oguro et al. | 386/95 |
| 5,786,952 | 6/1998 | Umemoto et al. | 360/48 |
| 5,852,706 | 12/1998 | Ogikubo et al. | 386/111 |
| 5,857,044 | 1/1999 | Ogawa et al. | 386/62 |

FOREIGN PATENT DOCUMENTS

| | | |
|---|---|---|
| 0 524 715 A2 | 1/1993 | European Pat. Off. . |
| 0 644 691 A2 | 3/1995 | European Pat. Off. . |
| 0 661 885 A1 | 7/1995 | European Pat. Off. . |
| 8-223537 | 8/1996 | Japan . |

*Primary Examiner*—Thai Tran
*Attorney, Agent, or Firm*—Parkhurst & Wendel, L.L.P.

[57] ABSTRACT

A method of selectively recording one of plural kinds of video signals having different frame (field) rate and the accompanied sound signal comprises the steps of: converting one of plural kinds of video signals and the sound signal into another digital signal; generating the error check codes from the digital signal; recording the digital signal and the generated error check codes on a recording medium, wherein one of a plural kinds of video signals and the digital sound signal are converted and the error check codes are generated to have the same data rate between the plural kinds of video signals to form the same M tracks (sectors) for the same interval on the recording medium between the plural of kinds of digital video signals. The error check codes are generated every N tracks (sectors), the M being natural number more than one: N being a divisor of the M. Sequence number data is generated and recorded on the recording medium together with the another digital signal and the generated error check codes every track (sector).

6 Claims, 8 Drawing Sheets

FIG. 7A  ID 1 | bit 7 | bit 6 | bit 5 | bit 4 | bit 3 | bit 2 | bit 1 | bit 0 |
— Seq # — (bits 4–7), track pair # (bits 1–3)

FIG. 7B  ID 2 | bit 7 | bit 6 | bit 5 | bit 4 | bit 3 | bit 2 | bit 1 | bit 0 |
— SB #

FIG. 7C  ID 3 (PARITY) | bit 7 | bit 6 | bit 5 | bit 4 | bit 3 | bit 2 | bit 1 | bit 0 |

FIG. 8A

| SEQUENCE No. | 0000 | 0001 | 0010 | 0011 | ----- | 0000 |
|---|---|---|---|---|---|---|

FIG. 8B

| TRACK PAIR No. | 000 | 001 | 010 | ----- | 000 |
|---|---|---|---|---|---|

FIG. 8C

| SB # | 00000000 | 00000001 | 00000010 | ----- | 10110011 | 00000000 |
|---|---|---|---|---|---|---|

METHOD OF RECORDING ONE OF DIFFERENT DATA

BACKGROUND OF THE INVENTION

1. Field of the Invention

This invention relates to a method of digitally recording data on a recording medium, and particularly to a method of recording video data and accompanied sound data on a magnetic tape through a helical scanning.

2. Description of the Prior Art

A method of digitally recording video data and accompanied sound data on a magnetic tape through a helical scanning is known. Moreover, a method of recording video data and the accompanied sound data having different signal formats, such as the NTSC and the PAL methods to provide a common track pattern is known. This is disclosed as the method of digitally recording video data and the accompanied sound data capable of editing the video data and sound data track by track without editing gaps in Japanese patent application provisional publication No. 8-223537 and in the corresponding U.S. patent application Ser. No. 08/595828. In the method, the track format includes a first block of tracks for video data and a second block of tracks for sound data for a predetermined number of frames. One of a plurality of kinds of video data having different amounts of data per frame or field and the accompanied sound data (NTSC and PAL color video signal systems for example) is selectively recorded. In this method, the video data and sound data are recorded with a recording and editing unit which is a determined by a common multiple of the selected one of kinds of video data among the amounts of data of the different kinds of video data. In NTSC method the video and sound data are recorded every six frames or fields and in the PAL method, the video and sound data are recorded every five frames or fields, so that a track pattern having T=24 tracks including P tracks for sound data and T–P tracks for video data are recurrently recorded. The video and sound data are recorded track by track, so that video and sound data can be edited tack by track. That is, the digital signal of the NTSC method and the digital signal of the PAL method are commonly recorded every 24 tracks, so that track patterns are made common. Then, selectively editing can be provided in both NTSC and PAL methods.

SUMMARY OF THE INVENTION

The aim of the present invention is to provide an improved method of recording data.

According to the present invention, a method of selectively recording one of a plurality of digital video signals having different frame rates or field rates and a digital sound signal accompanied with one of a plurality of video signals is provided, which comprises the steps of: converting one of a plurality of kinds of digital video signals and the digital sound signal into another digital signal; generating error check codes from the another digital signal; recording the digital signal and the generated error check codes on a recording medium, wherein one of a plurality of kinds of digital video signals and the digital sound signal are converted and the error check codes are generated to have the same data rate between the plurality of kinds of digital video signal to form the same M tracks or sectors for the same interval on the recording medium between the plurality of kinds of digital video signals and the error check codes are generated every N tracks or sectors, the M being natural number more than one, N being a divisor of M.

The method may further comprise the steps of: generating a sequence number data every track or sector, the sequence number data increasing every track or sector and cycling every M tracks or M sectors; and recording the sequence number data on the recording medium together with another digital signal and the generated error check codes every the track or the sector.

The method may further comprise the step of: variable-length-coding one of a plurality of video signals and the sound signal to have a predetermined group of picture structure every predetermined cycle corresponding to M tracks or M sectors.

The method may further comprise the step of: variable-length-coding one of a plurality of video signals and the sound signal to have a predetermined group of picture structure including an intra-coded frame of one of a plurality of video signal every predetermined cycle corresponding to M tracks or M sectors, the intra-coded frame being recorded at a first track or field of M tracks or M sectors.

In the method, wherein the plurality of digital video signals are NTSC video signal and the PAL video signal and the NTSC video signal is converted every 6 m frames or every 6 m fields of the NTSC video signal and the PAL video signal is converted every 5 m frames or every 5 m fields to form the same M tracks or sectors for the same interval on the recording medium between the plurality of kinds of digital video signals, the m being a natural number.

BRIEF DESCRIPTION OF THE DRAWINGS

The object and features of the present invention will become more readily apparent from the following detailed description taken in conjunction with the accompanying drawings in which:

FIGS. 7A to 7C are illustrations showing data format of address information in the synchronous blocks of the main data area and the error correction code area shown in FIG. 3;

FIG. 8A is an illustration of the first embodiment showing variation of the sequence number;

FIG. 8B is an illustration of the first embodiment showing variation of the track pair number;

FIG. 8C is an illustration of the first embodiment showing variation of the synchronous block number;

The same or corresponding elements or parts are designated with like references throughout the drawings.

DETAILED DESCRIPTION OF THE INVENTION

Figure 1:
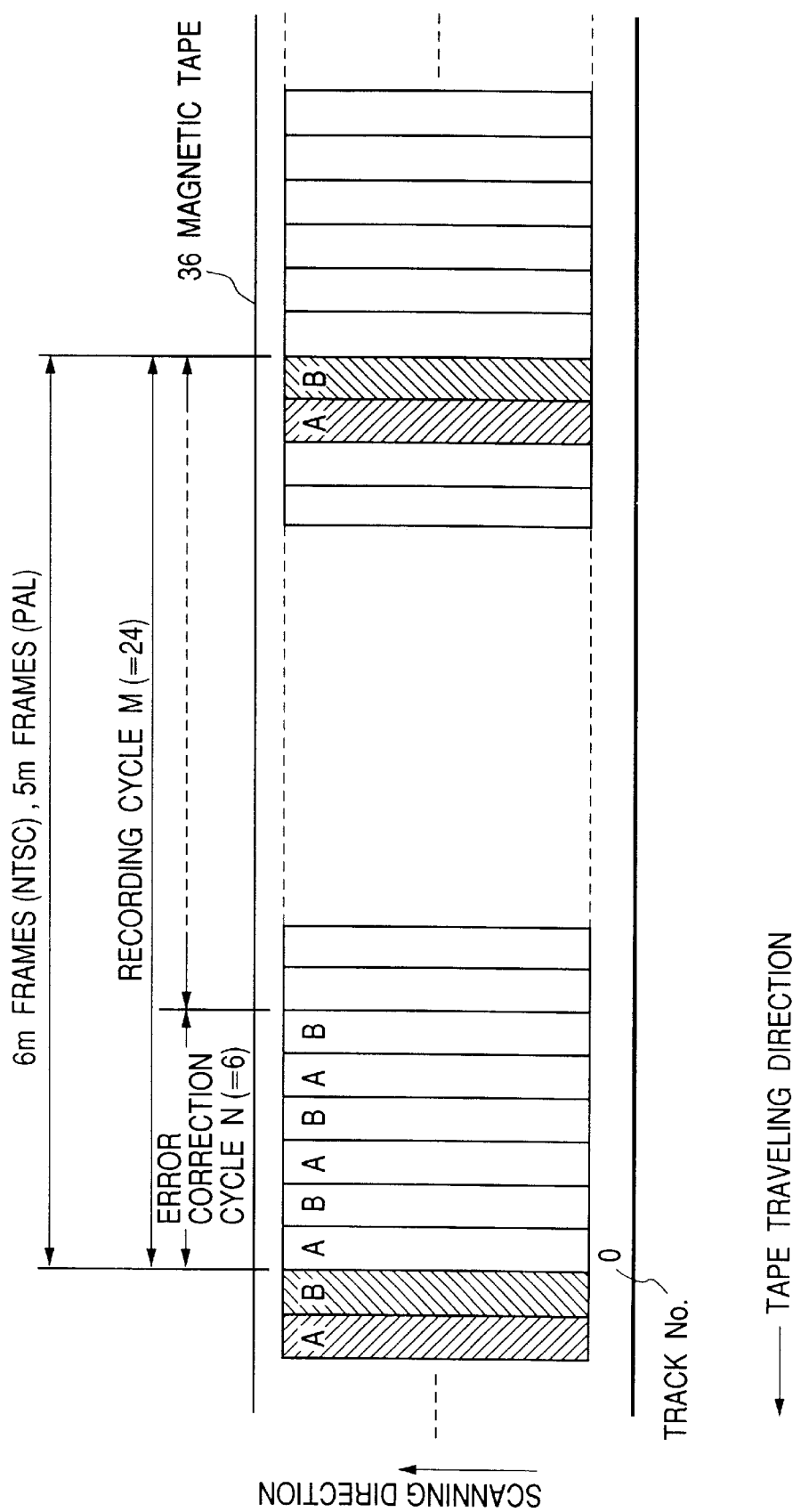
FIG. 1 is an illustration of a first embodiment showing a track format.
Figure 2:
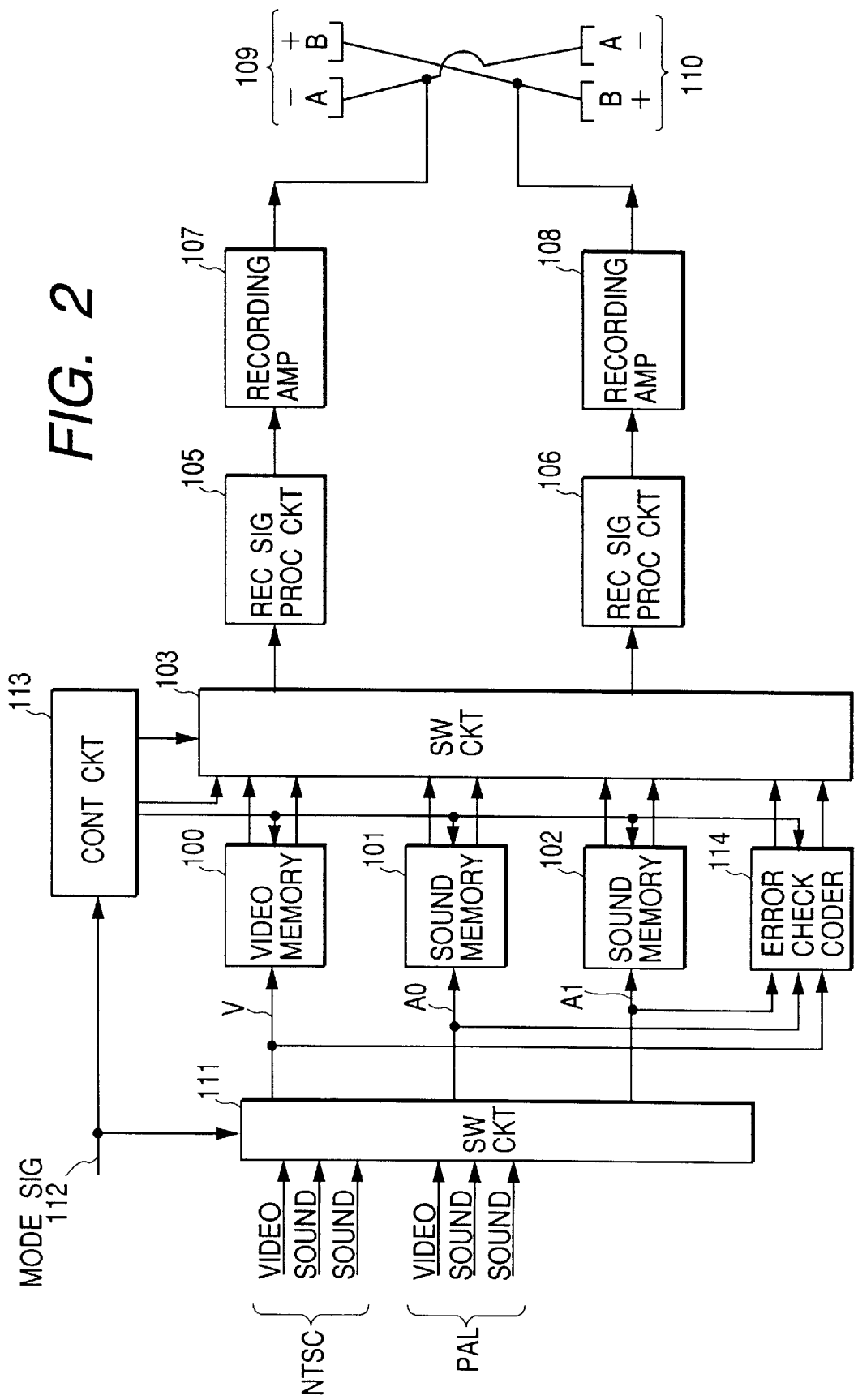
FIG. 2 is a block diagram of a recording apparatus employing the method of recording data according to the first embodiment.

Hereinbelow will be described a first embodiment of this invention. FIG. 1 is an illustration of the first embodiment showing a track format. FIG. 2 is a block diagram of a recording apparatus employing the method of recording data according to the first embodiment.

The recording apparatus of the first embodiment comprises a switch circuit 111, a video memory 100, a sound memory 101, and a sound memory 102, a switch circuit 103, a recording signal processing circuits 105 and 106, recording amplifiers 107 and 108, pair-head units 109 and 110, an error check coder 114 for generating error check codes from the video signal and sound signals from the switching circuit 111, and a control circuit 113. The switch circuit 111 supplies either of the NTSC video and sound signals or the PAL video and sound signals to the video memory 100 and sound memories 101 and 102 respectively in accordance with a mode signal 112. The error check coder 114 generates the error check codes from the video signal and sound signals from the switching circuit 111. The video memory 100 and the sound memories 101 and 102, the error check coder 114, and the switching circuit 103 supplies data to the recording signal processing circuit 105 and to the recording signal processing circuit 106 under control of the control circuit 113 to form the track format shown in FIG. 1 and data blocks included in each track through the helical scanning. The control circuit 113 generates control data also.

The data from the switching circuit 103 are recorded by the two pair head units arranged on a rotary cylinder (not shown) with an angle displacement of 180°. Each of pair head units 109 and 110 comprises magnetic heads, closely arranged, having different azimuthes. One of the pair head units 109 and 110 forms consecutive two tracks A and B having different azimuth angles at the same time and then, another pair head unit forms the following consecutive two tracks A and B. The control circuit 113 controls the video memory 100, the sound memories 101 and 102, the error check coder 114, and the switching circuit 103 to form a plurality of synchronous blocks (the data blocks), each including a predetermined amount of data on each track.

The rotary cylinder is rotated at 30 rps and when the NTSC video signal and the accompanied sound signals are selected, they are recorded with a recording cycle N=24 corresponding to six frames of the NTSC video signal. When the PAL video signal and the accompanied sound signals, of which frame rate is different from the NTSC video signal, are selected, they are recorded with the same recording cycle N=24 corresponding to five frames of the PAL video signal.

This point will be described more specifically.

In the NTSC method, the number of scanning line is 525 and the number of fields is 60 (30 frames). In the PAL method, the number of scanning line is 625 and the number of fields is 50 (25 frames).

Generally, if a ratio of amounts of data for one frame period between the NTSC method and the PAL method is determined as 5:6 which is an inverse of a ratio of the numbers of frames between the NTSC and the PAL methods. On the other hand, for example, the resolution of one frame of the NTSC method is defined to be 720 (H)×480 (V) and the resolution of one frame of the PAL method is defined to be 720 (H)×576 (V) wherein the sampling frequencies are the same in both methods.

Then, the amounts of data of one frame are assumed to be 480a and 576a in the NTSC and PAL methods respectively, where "a" is a positive real number.

In both methods, if there is a common number of frames providing the same amount of data, this common number of frames provides a recording and editing unit (editing unit) which is a minimum number of frames for recording and editing for providing a common track pattern.

Then, the number of frames providing the same amount of data is given by:

M0=LCM (480a, 576a)/480a=6 in the NTSC method and

M1=LCM (480a, 576a)/576a=5 in the PAL method

That is, the amount of data (video) for six frames in the NTSC method is equal to the that for five frames in the PAL method. In these equations, LCMs (x, y) are functions for determining least common multiples between x and y.

More concretely, the video data is recorded by pair head units 109 and 110, each pair head unit is displaced with the angle of 180 degrees on a rotary cylinder (not shown) and is rotated at a rotational speed of 1800 rpm (=30 rps). Then, fourth tracks are formed per rotation of two pair head units 109 and 110, so that the number of tracks T of one recording and editing unit in the NTSC method is given by:

T=6[Frame/Edit unit]×4[track/round]×30[round/sec]/30[Frame/sec]=24[track/Edit unit]

The number of tracks T of one recording and editing unit in the PAL method is given by:

T=5[Frame/Edit unit]×4[track/round]×30[round/sec]/25[Frame/sec]=24[track/Edit unit]

That is, in both methods, the number of tracks T of one recording and editing unit are 24.

Therefore, the track structure of the NTSC method can be made the same as that of the PAL method. That is, as shown in FIG. 1, in both NTSC and PAL methods, the video signal is recorded or edited every cycle of twenty-four tracks (T=24). In other words, in the NTSC method, the video signal is recorded or edited every six frames and in the PAL method, the video signal is recorded or edited every five frames, so that the common track structure between the NTSC method and the PAL method having the cycle of twenty-four tracks is recurrently formed on magnetic tape 36. Therefore, the video signal can be recorded or edited every recording cycle, that is, every twenty-four tracks.

Moreover, the error check codes are recorded with a error correction cycle N=6 in both NTSC and PAL methods as shown in FIG. 1. N is a natural number and more than one which is determined by a divisor of the number (24) of tracks corresponding to the recording cycle.

Figure 3:
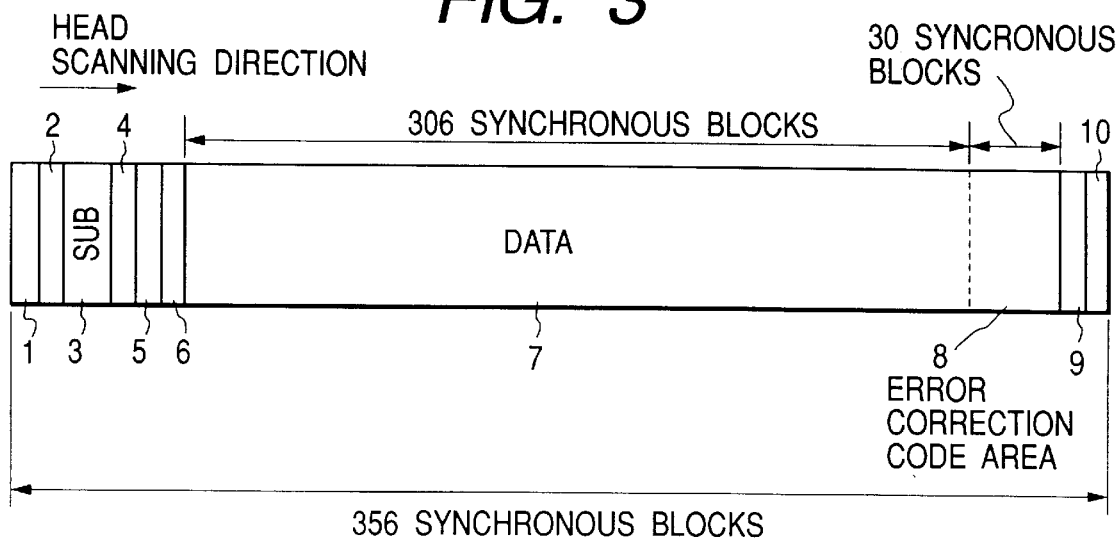
FIG. 3 is an illustration showing a track format of the first embodiment.

FIG. 3 is an illustration showing a track format of the first embodiment.

The track format includes a margin area 1, a preamble area 2, a sub-code area 3, a post amble area 4, an IBG area 5, a preamble area 6, a data area 7, an error correction code area 8, a post amble area 9, and a margin area 10. The data area 7 includes 306 synchronous blocks and the error correction code area 8 includes 30 synchronous blocks for recording outer codes for error correction (C3 code).

As mentioned, the error correction codes are generated every six tracks (error correction cycle N), that is, the error correction codes complete every six tracks. Then, the error correction codes are subjected to data shuffling over 180 synchronous blocks and each of 30 synchronous blocks out of 180 synchronous blocks are recorded at the error correction code area 8 on each track.

The margin area 1 uses two synchronous blocks and the preamble area 2, the post amble area 4, and the IBG area 5 use three synchronous blocks respectively. The preamble area 6 uses one synchronous block. The sub-code area 3 uses four synchronous blocks and the post amble area 9 and the margin area 10 use two synchronise blocks respectively. Then, each track includes 356 synchronous blocks.

Figure 4:
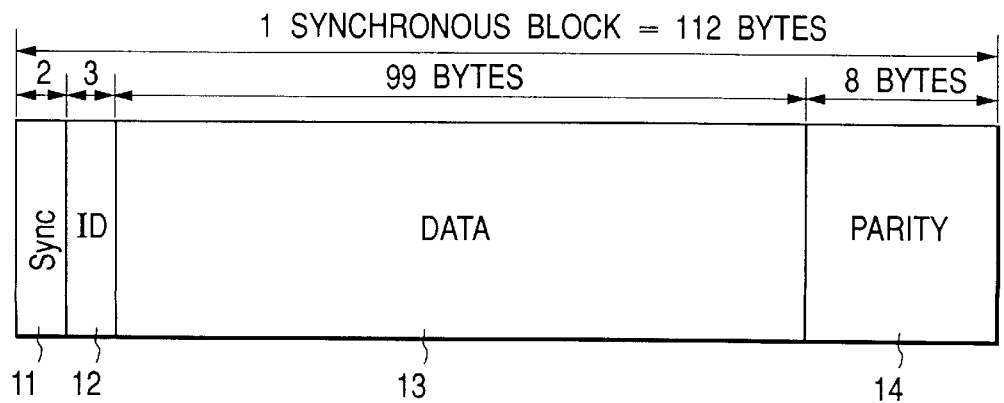
FIG. 4 is an illustration of the first embodiment showing a format of the synchronous block of the data area and the error correction code area shown in FIG. 3.

FIG. 4 is an illustration of the first embodiment showing a format of the synchronous block of the data area and the error correction code area 8.

The synchronous block of the data area 7 and the error correction code area 8 includes 112 bytes, that is, two bytes for the synchronous signal area 11, three bytes for the address information (ID) area 12, 99 bytes for the data area 13 for storing data such as the video data and the sound data, and eight bytes for the parity area 14 for storing error correction codes for error correction of this synchronous block.

Figure 5:
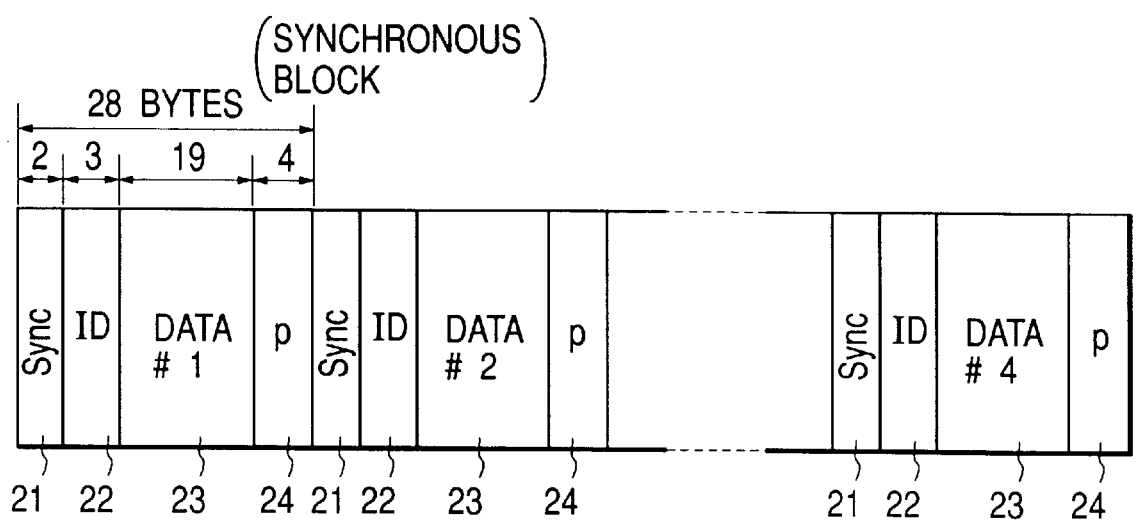
FIG. 5 is an illustration of the first embodiment showing a format of the sub-code area shown in FIG. 3.

FIG. 5 is an illustration of the first embodiment showing a format of the sub-code area 3.

The sub-code area 3 includes 16 synchronous blocks for recording 448 bytes of data. Each synchronous block includes 28 bytes, that is, two bytes of synchronous signal area 21, three bytes of address information (ID) area 22, 19 bytes of data area 23 for storing data, and four bytes of parity area 24 for storing error correction codes for error correction to this block. These 16 blocks are independent each other. At the sub-code area 3, information accompanied with the data in the data area 7 in the same track is recorded such as a format information of the data, a content of the program of the data, a date of recording.

Figure 6:
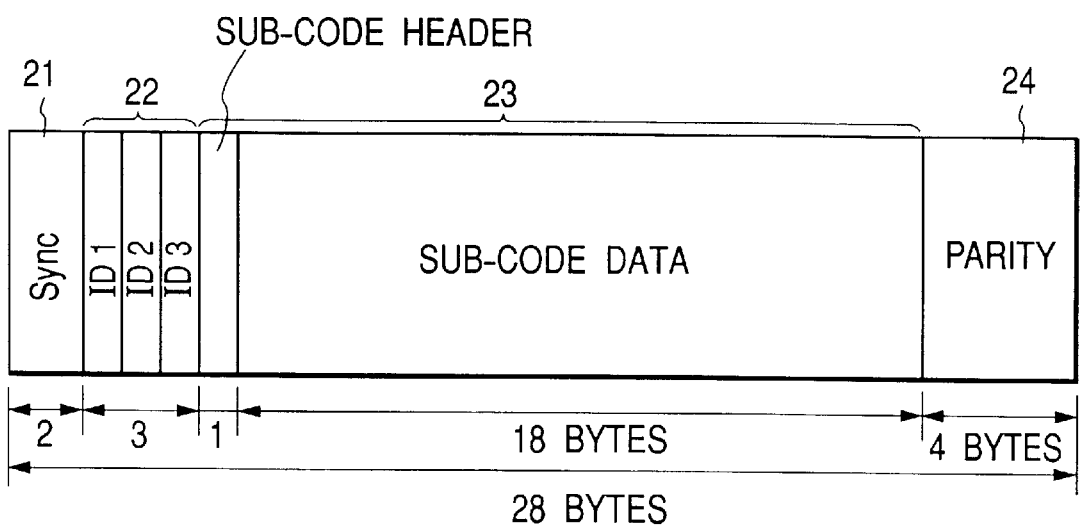
FIG. 6 is an illustration of the first embodiment showing a format of the synchronous block of the sub-code area shown in FIG. 3.

FIG. 6 is an illustration of the first embodiment showing a format of the synchronous block of the sub-code area 3, wherein the same or corresponding portions are designated as the same references as those in FIG. 5. As shown in FIG. 6, the data area 23 includes eighteen bytes of sub-code data and one byte of sub-code header.

FIGS. 7A to 7C are illustrations showing data format of address information in the synchronous blocks of the data area 7 and the error correction code area 8. The address information (ID) includes a first byte ID1, a second byte ID2, and a third byte ID3. The third byte ID3 is provided for error-detection in the first byte ID1 and the second byte ID2. All bits in the second ID2 and the lowest bit of the first byte ID1, that is, total nine bits, store a synchronous block number (SB#) of the data area 7 and the error correction code area 8.

In FIG. 7A, three bits BIT 1 to BIT3 of the first byte ID1 represent a track pair (pair head) number to show the error correction completion cycle. As mentioned earlier, the pair head units 109 and 110 comprise pair heads closely arranged and they generate consecutive two tracks at the same time and the angles of azimuthes are different each other. Then, this number represents a pair of tracks in the error correction cycle and each track is be distinguishable by the angle of azimuth.

The remaining four bits of the first byte ID1 represent the number of sequence in the cycle of recorded video signal (sequential number), wherein one sequence corresponds to one cycle of error correction cycle.

FIG. 8A is an illustration of the first embodiment showing variation of the sequence number, FIG. 8B is an illustration of the first embodiment showing variation of the track pair number, and FIG. 8C is an illustration of the first embodiment showing variation of the synchronous block number, wherein these drawings schematically showing a timing relation therebetween also.

The error correction codes are generated every six tracks (error correction cycle), so that the track pair number varies "0", "1", and "2" in decimal notation and this variation is recurrently repeated, so that tracks are recorded as shown in FIG. 1, wherein the error correction is completed every N (=6) tracks and the digital data is recorded with a recording cycle of M (=24) tracks in both NTSC and PAL method. N is a divisor of M. Therefore, as shown in FIG. 8A, the sequential number varies through "0", "1", "2", and "3" every six tracks, that is, every three pair tracks. That is, the recording or editing cycle is M=24, so that recording to edit the data can be provided every M tracks.

The upper two bits of the sequential number is always "0". However, it is also possible to use these two bits to expand the sequential number range. In such a case, the operation is similar because the lower two bits of the sequential number vary as similar to the above-mentioned operation.

The synchronous blocks of the data area 7 and the error correction code area 8 are represented by the sequence number 0 to 355 with nine bits as shown in FIG. 8C.

As mentioned above, a series of the error correction codes are recorded over a plurality of tracks or sectors, so that error correction against a bust error is improved.

Moreover, because the recording or editing cycle is M=24, so that recording to edit the data can be provided every M tracks between the NTSC and PAL methods.

As shown in FIGS. 8A and 8B, editing is started when the number of the sequence number is zero and the track pair number are zero, that is, when the track number is zero.

The third byte ID3, that is, assuming four bits of the bits 7 to bit 4 of the first byte ID1 are regard as symbols and similarly represented other four bits of the first to third byte ID1 to ID parity, that is, the bits 7 to bit 4 of the third byte ID3 are regard as symbols, the ID parity is represented by Reed Solomon codes determined by an operation using $x^4+x+1$ as modulus with respect to finite field GF ($2^4$) given by:

$$\sum_{i=0}^{5} symbol_i \times X^{5-i}$$

As mentioned, according to the first embodiment, the method of selectively recording one of a plurality of digital video signals having different frame rates or field rates and a digital sound signal accompanied with one of a plurality of video signals is provided. That is, one of a plurality of kinds of digital video signals and the digital sound signal is converted into another digital signal, the error check codes is generated from another digital signal, and the digital signal and the generated error check codes is recorded on a recording medium, wherein one of a plurality of kinds of digital video signals and the digital sound signal are converted and the error check codes are generated to have the same data rate between the plurality of kinds of digital video signal to form the same M tracks or sectors for the same interval on the recording medium between the plurality of kinds of digital video signals and the error check codes are generated every N tracks or sectors. M is a natural number more than one and N is a divisor of M and more than one.

A second embodiment will be described.

Figure 9:
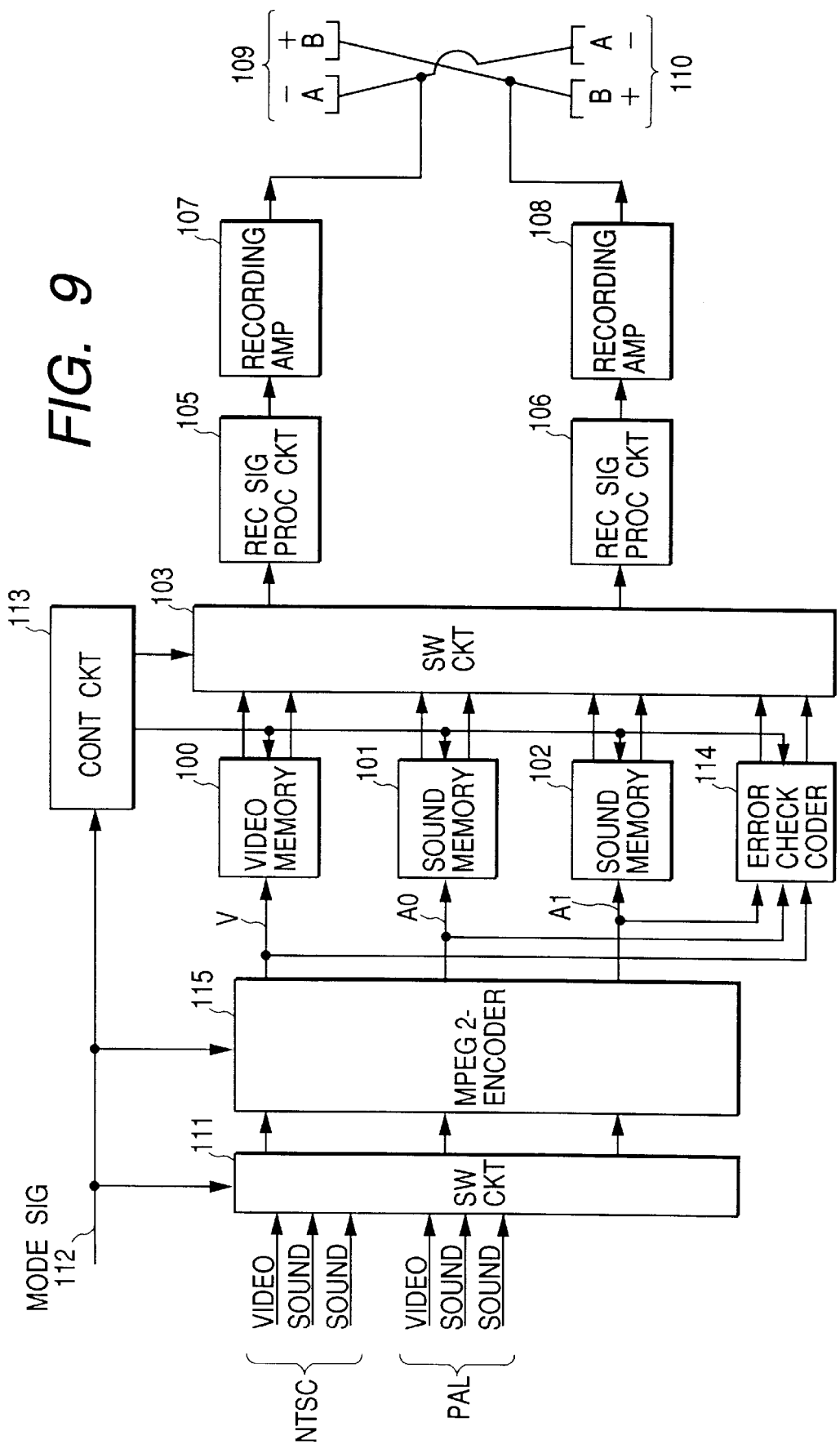
FIG. 9 is a block diagram of a recording apparatus of a second embodiment.

FIG. 9 is a block diagram of a recording apparatus of the second embodiment. The recording apparatus of the second embodiment has substantially the same structure as that of the first embodiment. The difference is that an MPEG-2 encoder 115 for variable-length-coding is further provided and the data is recorded every group of picture structure which includes at least an I (Intra-coded) picture and the group of picture structure is formed every editing cycle.

Figure 10:
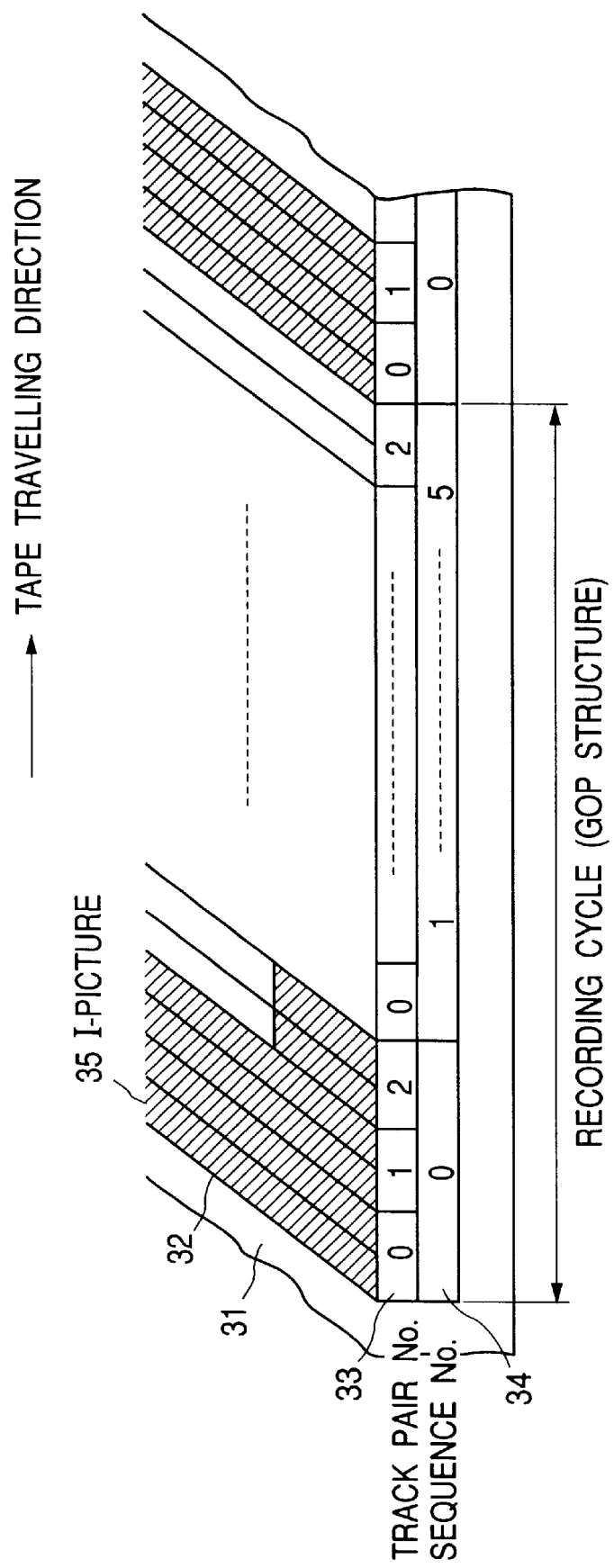
FIG. 10 is an illustration of the second embodiment showing a track format.

FIG. 10 is an illustration of the second embodiment showing a track format.

In the second embodiment, either of the (video/sound) data of the NTSC or the PAL methods is recorded through a variable-length-coding on the basis of MPEG to compress the data. That is, the data is recorded every group of picture structure which includes at least an I (Intra-coded) picture. The group of picture (GOP) structure includes three types of coded frames, namely, the inter-coded picture, a predictive-coded picture (P picture) and bidirectionally predictive-coded picture (B picture). Because the I picture is intra-coded, it does not need the previous frame data. Therefore, if the I picture can be accessed firstly with address data, a random accessing can be provided. That is, editing is possible.

In this embodiment, the recording cycle, that is, a cycle of GOP is 18 frames in the NTSC method and 15 frames in the PAL method, wherein amounts of data for these cycles are the same.

Then, every GOP structure is formed on 36 tracks and the error correction is effected every six tracks.

As shown in FIG. 10, the I-picture is recorded at top of the GOP structure, that is, the recording cycle. Therefore, the track pair number 33 varies "0", "1", and "2" repeatedly and the sequence number 34 increases every six tracks, which is a unit of error correction, and increases from 0 to 5 repeatedly, that is, after 36 tracks, the sequence returns to zero.

As shown in FIG. 10, at the first track of the recording cycle (the GOP structure) indicated by the track par number and the sequence number which are zero, the I-picture 35 is recorded.

According to this embodiment, the error correction is completed every six tracks, so that error correction against bust errors is improved and on the first track at every recording cycle, i.e., the GOP structure, the I-picture is recorded, so that editing can be provided every recording cycle without additional operation such as the writing after reading operation.

In the above-mentioned embodiments, the number of tracks for recording the NTSC video and sound digital signals of six frames is equalized to that for recording the PAL video and sound digital signals of five frames. However, it is also possible to equalize the number M of tracks between the NTSC and PAL methods by recording the NTSC video and sound digital signals of 6 m frames (fields) on M tracks and for recording the PAL video and sound digital signals of 5m frames (fields) on M tracks, wherein M is a natural number more than one. Moreover, the error correction is completed every N tracks, N being a divisor of M and more than one.

Moreover, in the above-mentioned embodiment, the digital signal is recorded on a magnetic tape by the helical scanning. However, this invention is applicable to a disc recording and reproduction apparatus using an optical disc or magnetic disc. In such a case, the controlling is made in accordance with the number of sectors instead of the tracks.

What is claimed is:

1. A method of selectively recording one of a plurality of digital video signals having different frame rates or field rates and a digital sound signal accompanied with said one of a plurality of digital video signals, which comprises the steps of:

converting one of a plurality of digital video signals and a digital sound signal into another digital signal, said one of a plurality of digital video signals and said digital sound signal being converted to have the same data rate in said plurality of digital video signals to form a common structure of M tracks or M sectors for the same interval on a recording medium in said plurality of digital video signals, M being a whole number greater than one;

generating said error check codes from another digital signal, said error check codes being generated every N tracks or N sectors to form a common error correction cycle of N tracks or N sectors in said plurality of digital video signals, N being a whole number treater than one which is determined by a divisor of M; and recording the converted another digital signal and the generated error check codes on said recording medium.

2. The method as claimed in claim 1, further comprising the steps of:

generating sequence number data every said track or sector, said sequence number data increasing every said track or sector and cycling every said M tracks or M sectors; and recording said sequence number data on said recording medium together with said another digital signal and the generated error check codes every said track or said sector.

3. The method as claimed in claim 1, further comprising the step of:

variable-length-coding said one of a plurality of digital video signals and said digital sound signal to have a predetermined group of picture structures every predetermined cycle corresponding to said M tracks or M sectors.

4. The method as claimed in claim 1, further comprising the step of:

variable-length-coding said one of a plurality of video digital signals and said digital sound signal to have a predetermined group of picture structures including an intra-coded frame of said one of a plurality of digital video signal every predetermined cycle corresponding to said M tracks or M sectors, said intra-coded frame being recorded at a first track or field of said M tracks or M sectors.

5. A method as claimed in claim 1, wherein said plurality of digital video signals comprise an NTSC video signal and a PAL video signal and said NTSC video signal is converted every 6 m frames or every 6 m fields of said NTSC video signal and said PAL video signal is converted every 5 m frames or every 5 m fields to form a common structure of M tracks or M sectors for the same interval on said recording medium in said plurality of digital video signals, m being a whole number.

6. A method as claimed in claim 3, wherein said plurality of digital video signals comprise an NTSC video signal and a PAL video signal and said NTSC video signal is converted every 6 m frames or every 6 m fields of said NTSC video signal and said PAL video signal is converted every 5 m frames or every 5 m fields to form a common structure of M tracks or M sector for the same interval on said recording medium in said plurality of digital video signals, m being a whole number.

* * * * *

UNITED STATES PATENT AND TRADEMARK OFFICE
CERTIFICATE OF CORRECTION

PATENT NO. : 6,125,233
DATED : September 26, 2000
INVENTOR(S) : Seiji HIGURASHI

It is certified that error appears in the above-identified patent and that said Letters Patent is hereby corrected as shown below:

IN THE CLAIMS:

Claim 1, line 13, delete "said".

Signed and Sealed this

Eighth Day of May, 2001

Attest:

NICHOLAS P. GODICI

Attesting Officer  Acting Director of the United States Patent and Trademark Office

UNITED STATES PATENT AND TRADEMARK OFFICE
CERTIFICATE OF CORRECTION

PATENT NO. : 6,125,233
DATED : September 26, 2000
INVENTOR(S) : Seiji Higurashi

It is certified that error appears in the above-identified patent and that said Letters Patent is hereby corrected as shown below:

<u>Column 8,</u>
Line 8, delete "said"

This certificate supercedes Certificate of Correction issued May 8, 2001.

Signed and Sealed this

Seventh Day of May, 2002

Attest:

JAMES E. ROGAN
Attesting Officer     *Director of the United States Patent and Trademark Office*